United States Patent
Tighe et al.

(10) Patent No.: US 10,949,353 B1
(45) Date of Patent: Mar. 16, 2021

(54) DATA ITERATOR WITH AUTOMATIC CACHING

(71) Applicant: Amazon Technologies, Inc., Seattle, WA (US)

(72) Inventors: Joseph Patrick Tighe, Seattle, WA (US); Stephen Gould, Seattle, WA (US); Vuong Van Le, Seattle, WA (US); Davide Modolo, Seattle, WA (US); Nataliya Shapovalova, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/785,166

(22) Filed: Oct. 16, 2017

(51) Int. Cl.
*G06F 13/28* (2006.01)
*G06F 12/0868* (2016.01)
*G06N 20/00* (2019.01)

(52) U.S. Cl.
CPC .......... *G06F 12/0868* (2013.01); *G06F 13/28* (2013.01); *G06N 20/00* (2019.01); *G06F 2212/1024* (2013.01); *G06F 2213/2802* (2013.01)

(58) Field of Classification Search
CPC .......... G06F 12/0868; G06F 13/28; G06F 2212/1024; G06F 2213/2802; G06N 99/005
See application file for complete search history.

(56) References Cited

U.S. PATENT DOCUMENTS

| | | | |
|---|---|---|---|
| 9,495,207 B1* | 11/2016 | Pjesivac-Grbovic | ... G06F 9/546 |
| 2005/0149604 A1* | 7/2005 | Navada | .................... H04L 43/10 |
| | | | 709/200 |
| 2005/0206648 A1* | 9/2005 | Perry | ........................ G06T 1/60 |
| | | | 345/557 |
| 2007/0180041 A1* | 8/2007 | Suzuoki | .............. H04L 67/1097 |
| | | | 709/207 |
| 2014/0282624 A1* | 9/2014 | Holt | ........................ G06F 9/542 |
| | | | 719/318 |
| 2017/0103022 A1* | 4/2017 | Kreinin | ............... G06F 12/0842 |
| 2018/0165580 A1* | 6/2018 | Boyer | ....................... G06N 5/04 |
| 2018/0307624 A1* | 10/2018 | Zmora | .................. G06F 12/128 |

* cited by examiner

*Primary Examiner* — Tim T Vo
*Assistant Examiner* — Harry Z Wang
(74) *Attorney, Agent, or Firm* — Lowenstein Sandler LLP

(57) ABSTRACT

A data processing pipeline controller receives a request, from a data iterator associated with a machine learning model, for a data output of a module in the data processing pipeline, wherein each module in the data processing pipeline has an associated cache. The controller determines whether a data output of the module is stored in the associated cache and responsive to the data output being stored in the associated cache, provides the data output from the associated cache to the data iterator without processing data through the module.

19 Claims, 6 Drawing Sheets

DATA ITERATOR WITH AUTOMATIC CACHING

BACKGROUND

Cloud computing defines a model for enabling ubiquitous, convenient, on-demand network access to a shared pool of configurable computing resources (e.g., networks, servers, storage, applications, services) that can be rapidly provisioned and released with minimal management effort or service provider interaction. Certain characteristics of the cloud computing model include on demand self-service, broad network access, resource pooling, rapid elasticity, and measured service. Cloud computing can include several service models, including Software as a Service (SaaS), Platform as a Service (PaaS), and Infrastructure as a Service (IaaS). The cloud computing model may be implemented according to one of the several deployment models, including private cloud, community cloud, public cloud, or hybrid cloud.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only.

DETAILED DESCRIPTION

Figure 1:
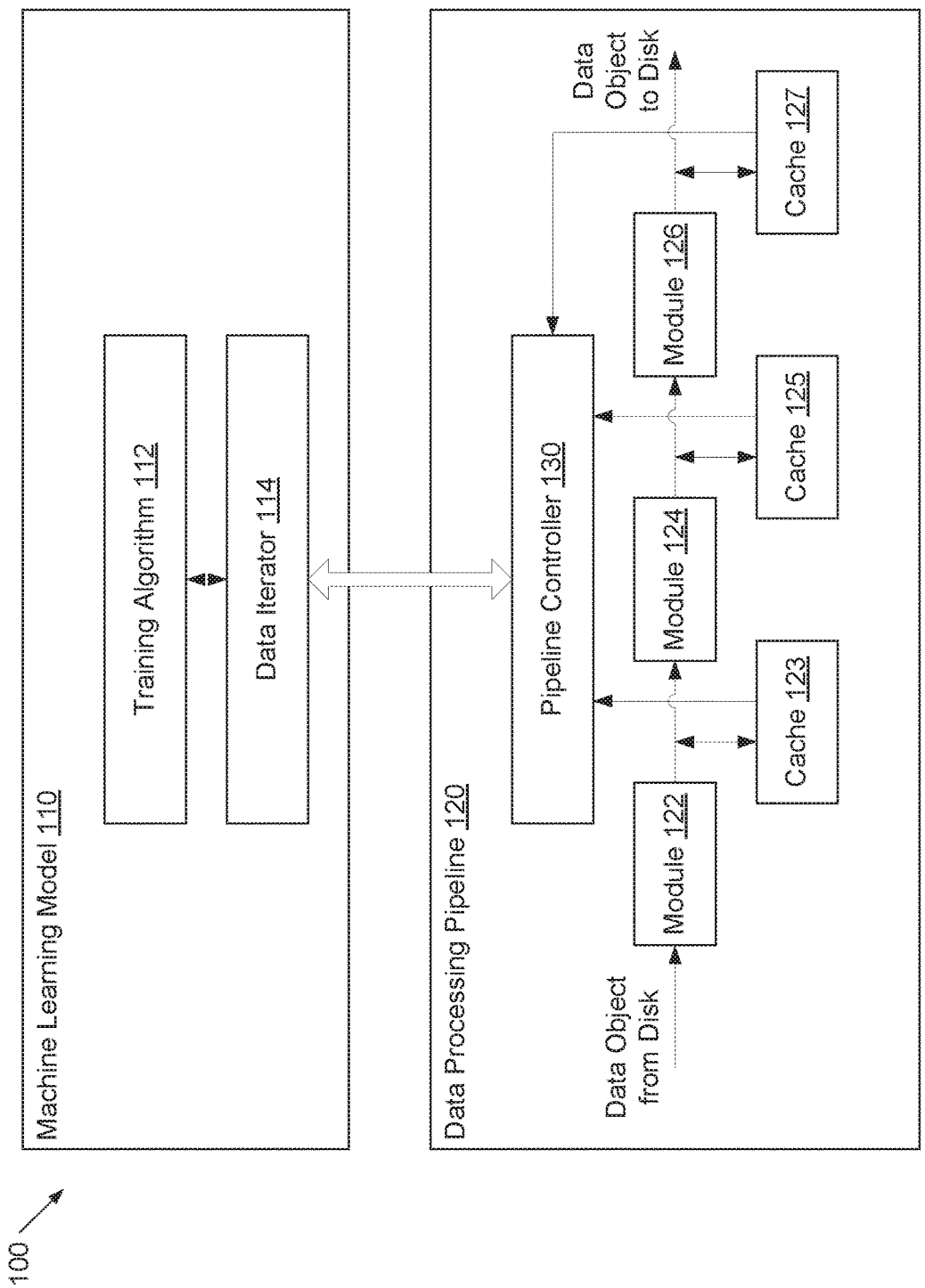
FIG. 1 is a block diagram illustrating a system having a data iterator with automatic caching, according to an embodiment.

Embodiments are described for a data iterator with automatic caching. In one embodiment, a machine learning model, such as a convolutional neural network for example, utilize a data iterator. One job of the data iterator is to read the data needed for training the machine learning model from a location where the training data is stored. The data iterator may have a list of assets (e.g., data objects) which it iterates over in a random or pseudo-random order, and can load batches of data objects from the storage location and format those data objects into a form expected by the training algorithm of the machine learning model. In some cases, a very lightweight transform may be applied to the asset, such as adding noise for example, to improve model robustness. This process is sometimes called data augmentation.

During the training process for the machine learning model, the data objects are not just read once, but generally are read over and over as the training continues. For some tasks in the training process, the data objects may be pre-processed through some set of heavy operations which can be expensive to apply on-the-fly during each iteration. To enable the data iterator to operate quickly without experiencing severe latency, in one embodiment, the input data can be run through a pre-processing pipeline before the actual training is performed. The output of the pre-processing pipeline can be saved to disk and the data iterator can iterate over these pre-processed files.

In an illustrative example, for video it may be desirable to compute an estimate of how much each pixel has moved from one frame to the next frame. This movement, known as optical flow, can be computed by one module in the pre-processing pipeline and saved to disk. Then a data iterator could iterate over these pre-computed optical flow files, feeding the optical flow data to the training algorithm.

Instead of a conventional two stage system, in one embodiment, the data iterator can be built on top of a data processing pipeline that supports automatic caching of intermediate output. The data processing pipeline may include a number of modules, each configured to perform a certain processing operation, where an output of each module in the pipeline (except the last module) is provided as an input to a subsequent module in the pipeline. In one embodiment, the original data object is loaded and run through the modules of the data processing pipeline. This process can be fairly heavy weight and can potentially take a long time and utilize a large amount of resources. In one embodiment, however, the output of each module in the data processing pipeline is saved to a cache for later use before being provided to a subsequent module for additional processing. As part of the caching process, the data may also be formatted for faster subsequent operations (or smaller storage) before being fed to the training algorithm.

After the training algorithm has iterated through the data once completely, it will reset the data iterator and start going through the data again, in the same or a different order. This time, and each subsequent time, the data processing pipeline can automatically determine whether the requested data has already been computed and cached on the disk. For example, the data iterator may request an intermediate output (i.e., the output of one of the intermediate modules in the pipeline, rather than the last module). Since the intermediate output was cached during the first iteration, the data iterator can load only the cached data output instead of loading the original data object and running it through the entire pipeline again. This improves the speed of the data processing pipeline, reduces latency visible to the machine learning model and reduces overall resource utilization on the host machine running the machine learning model and data processing pipeline.

One advantage of the data iterator and pipeline described herein is that it only computes data when needed and saves those computations for future iterations. Thus, the machine learning model can start training without having to complete an entire pre-processing step. In addition, algorithm designers do not need to think about what data has to be pre-computed since the iterator can automatically determine what computation steps are needed.

FIG. 1 is a block diagram illustrating a system having a data iterator with automatic caching, according to an embodiment. In one embodiment, the system 100 includes machine learning model 110 and data processing pipeline 120. In one embodiment, machine learning model 110 is formed from sample inputs and is designed to make data-driven predictions or decisions. Machine learning model 110 may include, for example, an artificial neural network, such as a convolutional neural network (CNN), a support vector machine (SVM), or any other type of machine learning framework. In one embodiment, machine learning model 110 includes training algorithm 112 and data iterator 114. Training algorithm 112 operates to infer a function from training data including a set of training examples. Each example may include an input object and a desired output value. Training algorithm 112 can analyze the training data to produce an inferred function, which can be used for mapping new examples. During the training process, training algorithm 112 may iterate through the training data many (e.g., tens, hundreds, or more) times. Data iterator 114 is an object that enables training algorithm 112 to traverse the training data. Data iterator 114 is responsible for obtaining a batch of the training data (e.g., some subset of objects of the entire available training data and corresponding desired output values), and formatting the data into a form expected by training algorithm 112. This may include, for example, running the selected data objects in the batch through data processing pipeline 120.

In one embodiment, data processing pipeline 120 may include a pipeline controller 130 and a number of modules 122, 124, 126, each configured to perform a certain processing operation. The module 122, 124, 126 may be arranged such that the output of each module in the pipeline (except the last module) is provided as an input to a subsequent module in the pipeline. For example, module 122 may receive the original data object as an input, perform a corresponding processing operation, and provide the output to module 124. Module 124 may similarly perform its corresponding processing operation on the received data provide its own output to module 126. This process may continue for however many modules are present in data processing pipeline 120. In other embodiments, the modules in data processing pipeline 120 may not be strictly linear and there may be multiple of different branches and paths of data processing in pipeline 120. In other embodiments, there may be any number of different types of modules present in data processing pipeline 120. In one embodiment, the output of each module 122, 124, 126 in the data processing pipeline 120 is saved to a corresponding cache 123, 125, 127. In one embodiment, each module 122, 124, 126 has a separate associated cache 123, 125, 127. In another embodiment, one single cache is used to store the outputs of each of modules 122, 124, 126 together. In one embodiment, the outputs are stored in caches 123, 125, 127 so that they can be accessed by data iterator 114 on future iterations. Since training algorithm 112 may traverse the training data multiple times, data iterator 114 can save time and resources by accessing the output of any module, including an intermediate module, in data processing pipeline from the corresponding cache without having to run the original data object through each of the modules in the pipeline 120 up to that point.

Over time the machine learning training data, from which the original data objects, are drawn, may be updated. By caching the outputs of each module in data processing pipeline 120, any training data that is not updated (i.e., removed or modified) will be available for use by the machine learning model 110. Any updated training data (i.e., data objects that have been newly added or modified) can be automatically processed through the modules of the data processing pipeline 120 at least once. After that initial processing, the outputs of each module will also be cached in one of caches 123, 125, 127 to be available for future use. In this manner, only updated machine learning training data need be processed through the pipeline 120, while the non-updated machine learning training data is available in the cache for future iterations.

In one embodiment, each module 122, 124, 126 in data processing pipeline 120 has an associated unique identifier that encodes all of the processing steps leading up to this particular module. In one embodiment, the output of each module that is saved in corresponding cache 123, 125, 127 may be tagged with that unique identifier so that it can be retrieved later by pipeline controller 130 or can be used in other data processing pipelines. In one embodiment, pipeline controller 130 may receive a request from data iterator 114 for a particular piece or multiple pieces of processed data. That piece or pieces of data may be identified by the associated unique identifier of the module that performed said processing (e.g., an identifier associated with module 124). Pipeline controller 130 may determine whether the requested data is available in one of cache 125, and if found may return that data to data iterator 114 without the need to process the data through module 124. If the requested data is not available, pipeline controller 130 may determine whether the input for the associated module 124 is available (i.e., the output of module 122) in cache 123. If so, pipeline controller 130 can run the output of module 122 through module 124 in order to obtain the requested data. If not, pipeline controller 130 can continue back through the pipeline checking to see if any time and resources can be saved by using cached data rather than starting over with processing of the original data object. Additional details regarding a data iterator with automatic caching are provided below with respect to FIGS. 2-6.

Figure 2:
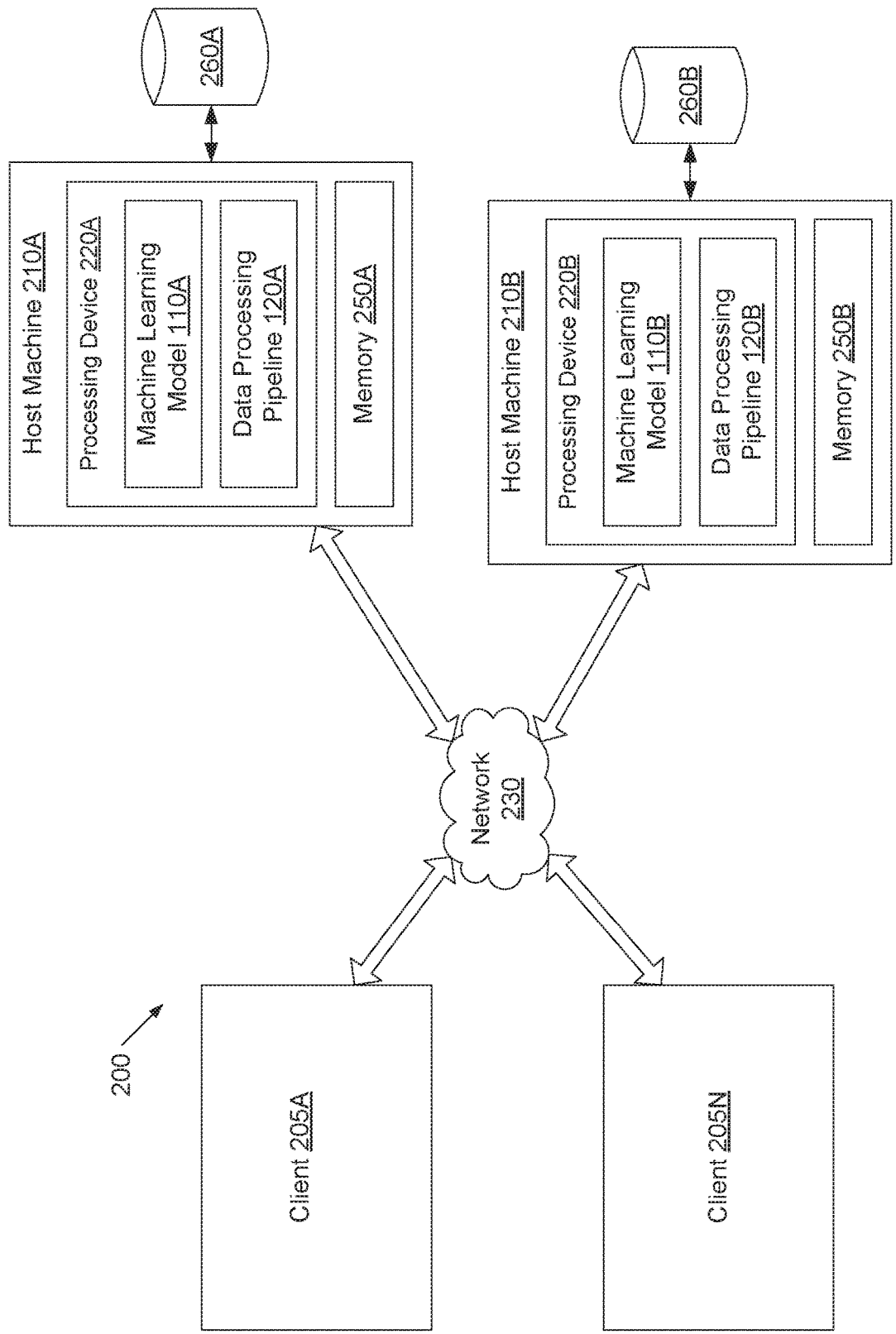
FIG. 2 is a block diagram of an exemplary network architecture, in which embodiments of the present disclosure may operate.

FIG. 2 is a block diagram of an exemplary network architecture 200, in which embodiments of the present disclosure may operate. In one embodiment, the network architecture 200 includes one or more cloud computing devices, such as host machines 210A-210B forming a computing cluster, which may be employed to provide cloud computing services to one or more clients, such as client devices 205A-205N. The client devices 205A-205N may communicate with host machines 210A-210B via one or more networks 230. Client devices 205A-205N are representative of any number of clients which may utilize host machines 210A-210B for storing and accessing data in network architecture 200. Client devices 205A-205N are representative of any number of stationary or mobile computers such as desktop personal computers (PCs), servers, server farms, workstations, laptops, handheld computers, servers, personal digital assistants (PDAs), smart phones, game consoles and so forth. It is noted that some systems may include only a single client device, connected directly or remotely, to host machines 210A-210B.

In alternative embodiments, the number and type of client devices, host machines, and data storage devices is not limited to those shown in FIG. 2. At various times one or more clients may operate offline. In addition, during operation, individual client device connection types may change as users connect, disconnect, and reconnect to network architecture 200. Further, the systems and methods described herein may be applied to directly attached computing systems or network attached computing systems and may include a host operating system configured to perform one or more aspects of the described methods. Numerous such alternatives are possible and are contemplated.

In one embodiment, network 230 may utilize a variety of techniques including wireless connections, direct local area network (LAN) connections, wide area network (WAN) connections such as the Internet, a router, storage area network, Ethernet, and others. Network 230 may comprise one or more LANs that may also be wireless. Network 230 may further include remote direct memory access (RDMA) hardware and/or software, transmission control protocol/internet protocol (TCP/IP) hardware and/or software, router, repeaters, switches, grids, and/or others. Protocols such as Fibre Channel, Fibre Channel over Ethernet (FCoE), iSCSI, and so forth may be used in network 230. The network 230 may interface with a set of communications protocols used for the Internet such as the Transmission Control Protocol (TCP) and the Internet Protocol (IP), or TCP/IP.

In one embodiment, each host machine 210A-210B may be associated with one or more data storage devices 260A-260B. Examples of data storage devices include solid-state drives (SSDs), flash memory, magnetic or optical disks, tape drives, RAID arrays, EEPROM devices, storage area networks, network-attached storage, and/or any other devices capable of storing data.

Host machines 210A-210B may each include one or more processing devices 220A-220B, each comprising one or more processor cores. Each processor core includes circuitry for executing instructions according to a predefined general-purpose instruction set. The processor cores may access cache memory subsystems for data and computer program instructions. The cache subsystems may be coupled to a memory hierarchy comprising random access memory (RAM) 250A-250B and a storage device 260A-260B. Each of processing devices 220A-220B may execute a corresponding instance of a machine learning model 110 (i.e., 110A-110B) and of a data processing pipeline 120 (i.e., 120A-120B).

In one embodiment, machine learning models 110A and 110B may utilize training data sets stored in a corresponding data storage device 260A or 260B. As described herein, a data iterator in each machine learning model 110A and 110B may retrieve a batch of training data from the corresponding data storage device 260A or 260B and run that training data through the modules of an associated data processing pipeline 120A or 120B. In one embodiment, the output of each intermediate module in data processing pipeline 120A and 120B can be cached (e.g., in memory 250A or 250B) for later use by machine learning model 110A or 110B. In one embodiment, each of the modules in a single data processing pipeline 120A or 120B run on a same host machine, such as host machine 210A or 210B, though some modules in the same processing pipeline may be executed by different processing devices on that host machine, such as a central processing unit (CPU), graphics processing unit (GPU), etc. The caches implemented in memory 250A and 250B may be part of a network file system (NFS) that is accessible via network 230 and the caches may be distributed across one or more different physical host machines. In one embodiment, however, each host machine 210A or 210B may perform all of the processing operations for any one single data object.

Figure 3:
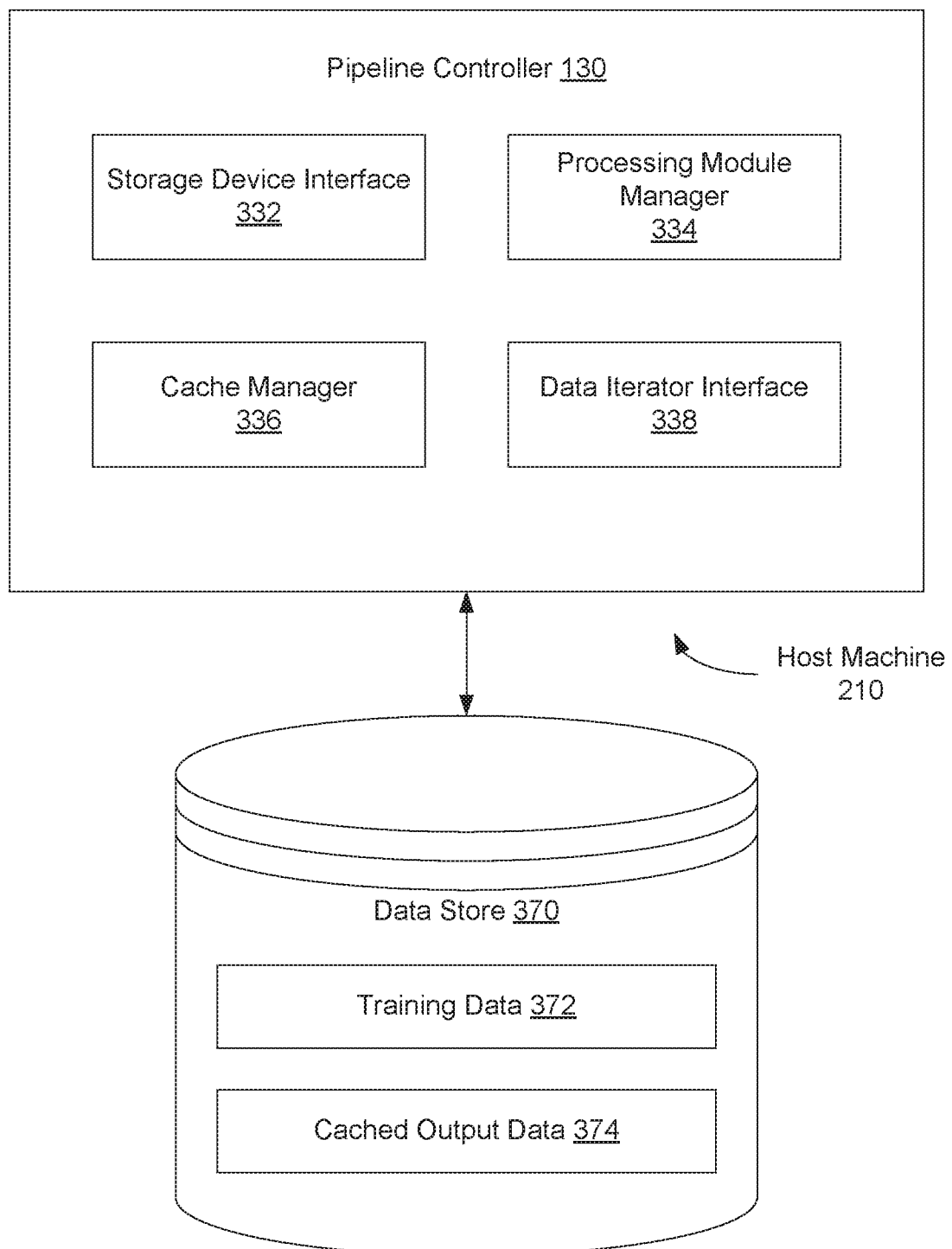
FIG. 3 is a block diagram illustrating a pipeline controller configured to implement automatic caching, according to an embodiment.

FIG. 3 is a block diagram illustrating a pipeline controller 130 configured to implement automatic caching, according to an embodiment. In one embodiment, pipeline controller 130 includes storage device interface 332, processing module manager 334, cache manager 336 and data iterator interface 338. This arrangement of modules and components may be a logical separation, and in other embodiments, these modules or other components can be combined together or separated in further components, according to a particular implementation. In one embodiment, data store 370 is connected to pipeline controller 130 and includes training data 372 and cached output data 374. In one implementation, one physical node (e.g., host machine 210) may include both pipeline controller 130 and data store 370. In another embodiment, data store 370 may be external to the physical node and may be connected over a network or other connection. In other implementations, the physical node and pipeline controller 130 may include different and/or additional components and applications which are not shown to simplify the description. Data store 370 may be embodied on one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium. Depending on the embodiment, training data 372 may be stored in one data store (e.g., storage device 260A or 260B) while cached data output 374 may be stored in a different data store (e.g., cache 123, 125, 127 on memory 250A or 250B).

In one embodiment, storage device interface 332 manages interactions between data processing pipeline 120 and storage devices 260A or 260B. In one embodiment, storage devices 260A and 260B may include sets of machine learning training data. These sets may include a plurality of individual data objects (e.g., images, videos, documents, files) that can be used by training algorithm 112 to train machine learning model 110. In one embodiment, in response to a request from data iterator 114, which may be received by data iterator interface 338, storage device interface 332 may retrieve a batch of training data objects from the corresponding data storage device 260A or 260B so that the training data can be processed through the modules of data processing pipeline 120.

In one embodiment, processing module manager 334 manages operation of the multiple data processing modules 122, 124, 126 of data processing pipeline 120. For example, processing module manager 334 may provide the data objects retrieved by storage device interface 332 to the first module 122 of the pipeline 120. Processing module manager 334 may further provide output of each intermediate module in the pipeline 120 as an input to a subsequent module in the data processing pipeline 120.

In one embodiment, cache manager 336 manages operation of the various caches 123, 125, 127 associated with data processing pipeline 120. In one embodiment, cache manager 336 stores the output of each of the modules 122, 124, 126 in data processing pipeline 120 in a corresponding cache 123, 125, 127. In addition, in response to a request for a particular data object from data iterator 114, cache manager 336 can determine whether the output of a corresponding module has been stored in the associated cache, and can retrieve that output data from the cache without having to process the data object through the module. In one embodiment, cache manager 336 also checks the health of the cache prior to reading any data stored in that cache to verify that the output data was stored properly during the original caching operation. The form of the health check may be dependent on the type of data being stored and on the nature of the processing operation performed by the corresponding module. For example, when a module calculates the optical flow for each frame of a video file, cache manager 336 may compare the number of frames for which an optical flow value was calculated with the number of frames in the original video. If the numbers match, cache manger 336 can determine that the caching operation was successful and can safely utilize the output data in the cache. If the cache is determined to be unhealthy, however, cache manager 336 may discard the contents of the cache, obtain the input data for the corresponding module, and run that input data through the module again in order to recalculate the output values.

In one embodiment, data iterator interface 338 manages interactions between data processing pipeline 120 and data iterator 114. In one embodiment, data iterator interface 338 receives requests for data from data iterator 114 and can provide cached data outputs from data processing pipeline 120 to data iterator 114.

Figure 4:
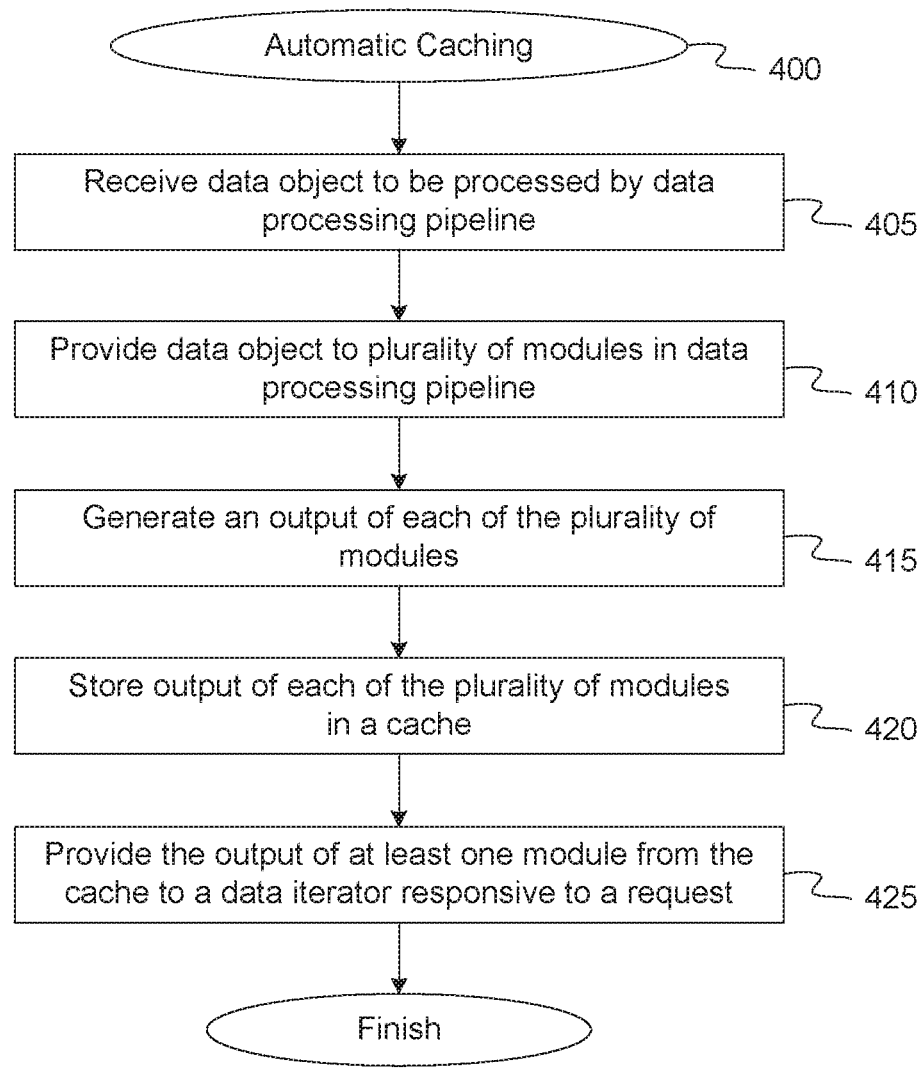
FIG. 4 is a flow diagram illustrating method of automatic caching for a data processing pipeline, according to an embodiment.

FIG. 4 is a flow diagram illustrating method 400 of automatic caching for a data processing pipeline 120, according to an embodiment. The method 400 may be performed by processing logic that comprises hardware (e.g., circuitry, dedicated logic, programmable logic, microcode, etc.), software, firmware, or a combination thereof. In one embodiment, method 400 may be performed by pipeline controller 130, as shown in FIGS. 1 and 3.

Referring to FIG. 4, at block 405, method 400 receives a data object to be processed by a data processing pipeline 120. In one embodiment, storage device interface 332 retrieves the data object from training data 372, which may be stored, for example, on one of data storage devices 260A or 260B. In one embodiment, the data object may be an individual data object, such as an image, video, document, file, or any other object that can be used by training algorithm 112 to train machine learning model 110.

At block 410, method 400 provides the data object to a first module 122 of a plurality of modules in the data processing pipeline 120. In one embodiment, processing module manager 334 applies the data object to the first module 122. The modules of pipeline 120 may be arranged such that an output of each intermediate module of the plurality of modules is provided as an input to a subsequent module of the plurality of modules. For example, the output of first module 122 is provided as an input to second module 124, and the output of second module 124 is provided as an input to third module 126, etc. In this manner, the data object is run through the entire data processing pipeline 120, although the data object may be modified by each individual module along the way. In other embodiments, the data object is provided to each module in data processing pipeline 120 directly in its original form.

At block 415, method 400 generates an output of each of the plurality of modules 122, 124, 126. In one embodiment, first module 122 may be configured to perform a corresponding processing operation on the data object. For example, if the data object was a frame of video, first module 122 may calculate the optical flow between this frame of video and a previous frame of video. The calculated optical flow value may be the data output of the first module 122. Other modules 124, 126 may perform additional processing operations using either the calculated optical flow output by module 122, the original data object provided to module 122, or some other input data to generate corresponding output data.

At block 420, method 400 stores the output of each of the plurality of modules 122, 124, 126 in a cache 123, 125, 127. In one embodiment, cache manager 336 directs each of modules 122, 124, 126 to store their generated output values as cached output data 374 in a corresponding cache 123, 125, 127. In one embodiment, each module 122, 124, 126 has a separate associated cache 123, 125, 127. In another embodiment, one single cache is used to store the outputs of each of modules 122, 124, 126 together.

At block 425, method 400 provides the output of at least one of the plurality of modules 124 from the cache 125 to a data iterator 114 associated with a machine learning model 110 responsive to a request from the data iterator 114. In one embodiment, data iterator interface 338 receives the request from data iterator 114 specifying a particular data output. Cache manager 336 may retrieve the data output from the corresponding cache and data iterator interface 338 may provide the data output back to data iterator 114. Additional details of the data retrieval process are described below with respect to FIG. 5.

Figure 5:
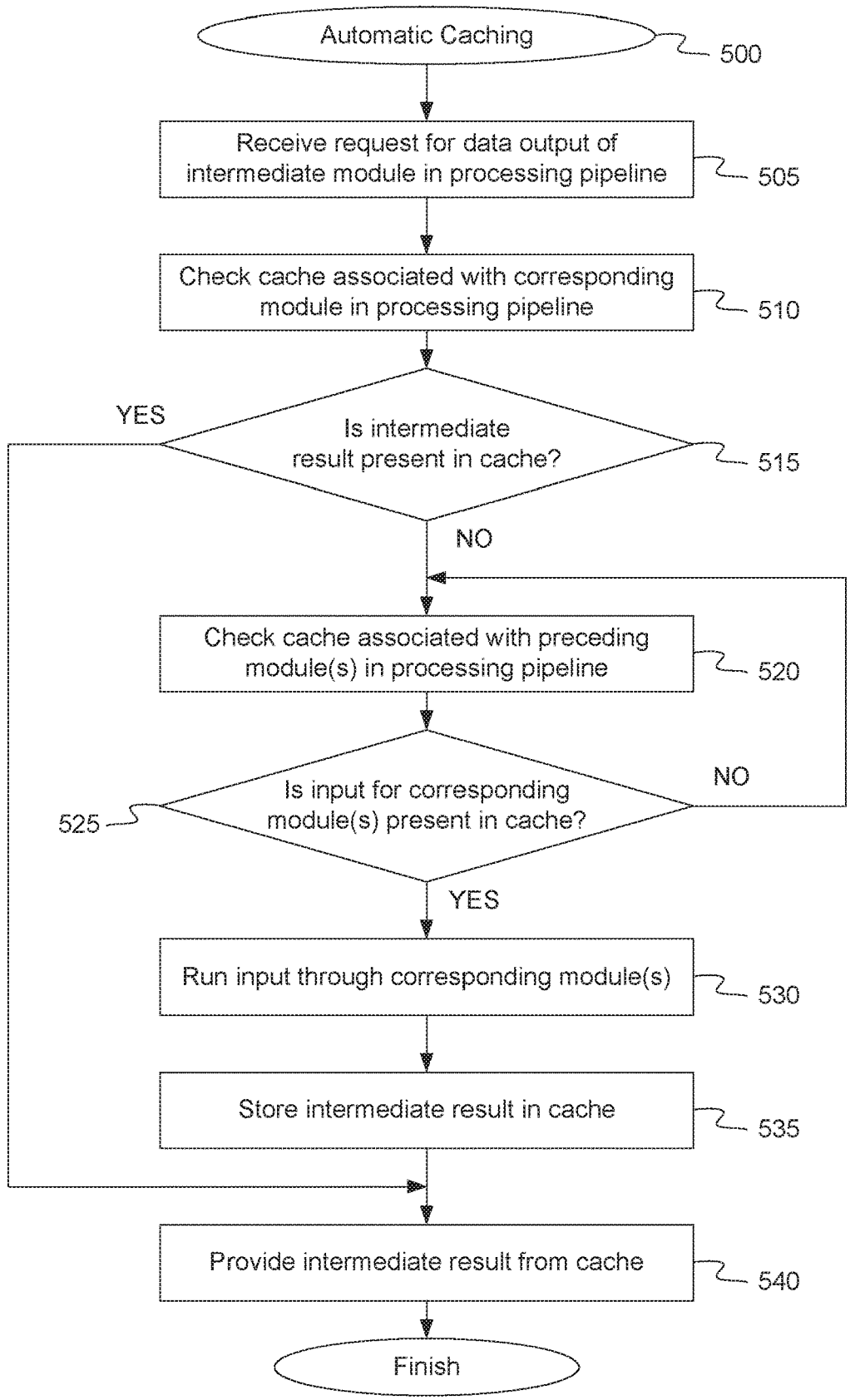
FIG. 5 is a flow diagram illustrating method of automatic caching for a data processing pipeline, according to an embodiment.

FIG. 5 is a flow diagram illustrating method 500 of automatic caching for a data processing pipeline 120, according to an embodiment. The method 500 may be performed by processing logic that comprises hardware (e.g., circuitry, dedicated logic, programmable logic, microcode, etc.), software, firmware, or a combination thereof. In one embodiment, method 400 may be performed by pipeline controller 130, as shown in FIGS. 1 and 3.

Referring to FIG. 5, at block 505, method 500 receives a request, from a data iterator 114 associated with a machine learning model 110, for a data output of a module 126 (or the data output of multiple modules) in a data processing pipeline 120. As part of a particular iteration, data iterator 114 may request data in a particular form (i.e., data that has been processed by the modules of data processing pipeline 120 up to a particular point). In one embodiment, the data in the requested form may be the data output of module 126. The request, for example, may include a unique identifier associated with module 126 in order to identify the particular form of the data that is desired.

At block 510, method 500 checks the cache 127 associated with the module 126. In one embodiment, cache manager 336 identifies cache 127, which is associated with module 126, using the unique identifier in the received request. In one embodiment, the output of module 126 that is saved in corresponding cache 127 is tagged with the unique identifier so that it can be retrieved later. At block 515, method 500 determines whether a data output of the module 126 is stored in the associated cache 127. In one embodiment, cache manager 336 reads cache 127 to determine whether any cached output data 374 is stored therein. If the data output is stored in the associated cache 127, method 500 proceed to block 540.

If method 500 determines at block 515 that the data output is not stored in the associated cache 127, at block 520, method 500 checks the cache 125 associated with a first preceding module 124 in the data processing pipeline 120. Since the modules are arranged in a pipeline, the output of the preceding module 124 serves as the input to module 126. In one embodiment, cache manager 336 identifies cache 125 and at block 525, method 500 determines whether a data input for the module 126 is stored in the cache 125 associated with the first preceding module 124 in the data processing pipeline 120.

If method 500 determines at block 525 that the data input for the module 126 is not stored in the cache 125, method 500 returns to blocks 520 and 525 to determine whether a data input for the first preceding module 124 is stored in a cache 123 associated with a second preceding module 122 in the data processing pipeline 120. Cache manager 336 can repeat this process going back along the pipeline 120 until it locates some cached output data. Responsive to identifying some cached output data anywhere along the pipeline 120, processing module manager 334 can run that data through the various modules of pipeline 120 until the desired form of the data is obtained. If no cached output data is identified, processing module manager 334 may run the original data object through the entire pipeline 120, up to the desired point.

If method 500 determines at block 525 that the data input for the module 126 is stored in the cache 125, at block 530, method 500 processes the data input through the module 126 to generate the data output of the module 126. At block 535, method 500 stores the data output of the module 126 in the associated cache 127.

At block 540, responsive to the data output being stored in the associated cache 127, method 500 provides the data output from the associated cache 127 to the data iterator 114 without processing data through the module 126. Since the output data was cached during an earlier iteration, data iterator interface 338 can provide the cached data output instead of loading the original data object and running it through the entire pipeline again. This can improve the speed of the data processing pipeline 120, reduce latency visible to the machine learning model 110 and reduce resource utilization on the host machine 210.

Figure 6:
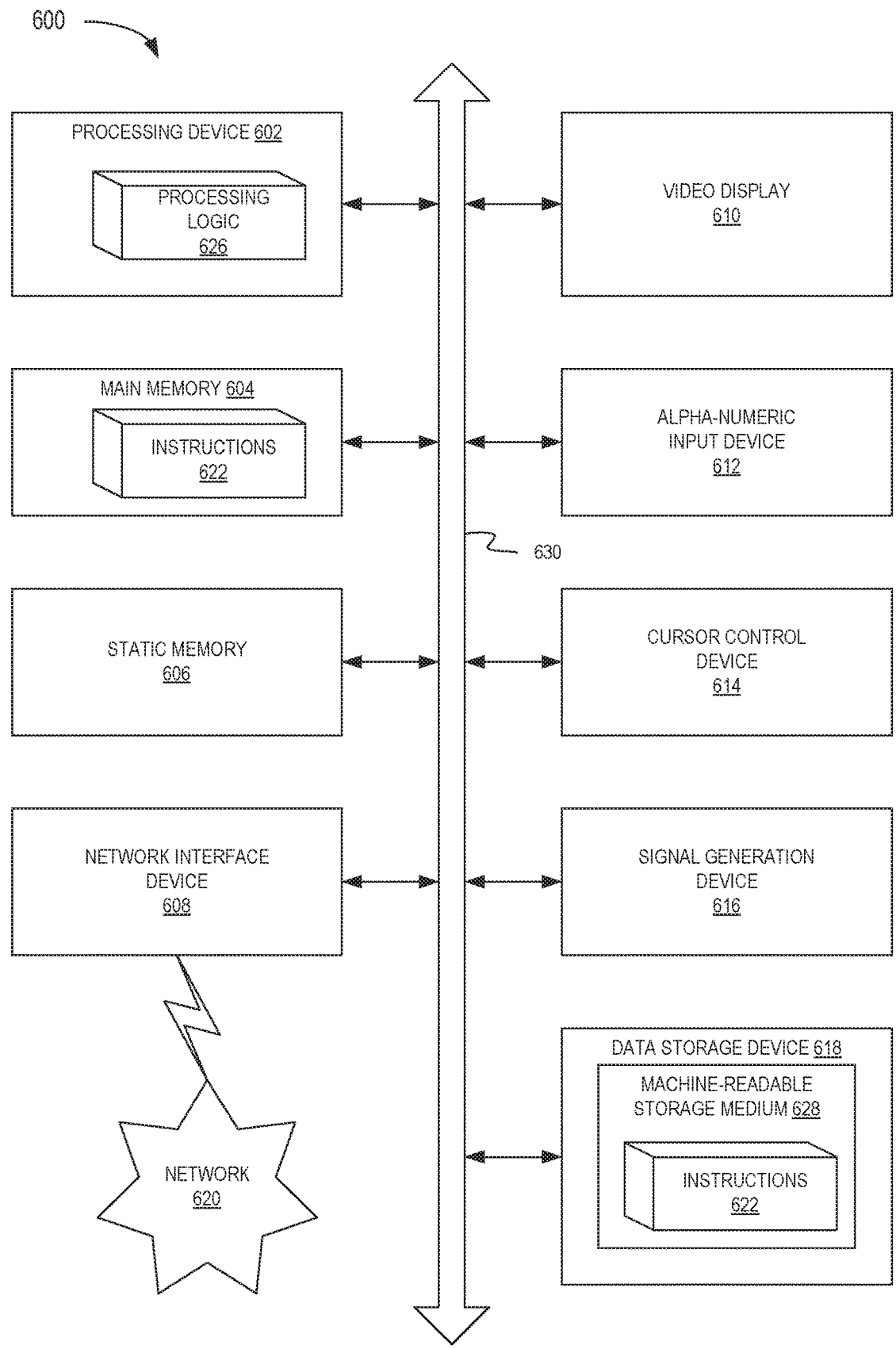
FIG. 6 is a block diagram illustrating one embodiment of a computer system, according to an embodiment.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a game console, a web appliance, a server, a host machine, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 600 may be representative of a computing device, such as host machines 210A-210B or client devices 205A-205N.

The exemplary computer system 600 includes a processing device 602, a main memory 604 (e.g., read-only memory (ROM), flash memory, dynamic random access memory (DRAM) (such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-accessible storage medium 628, on which is stored one or more set of instructions 622 (e.g., software) embodying any one or more of the methodologies of functions described herein. The instructions 622 may also reside, completely or at least partially, within the main memory 604 and/or within the processing device 602 during execution thereof by the computer system 600; the main memory 604 and the processing device 602 also constituting machine-accessible storage media. The instructions 622 may further be transmitted or received over a network 620 via the network interface device 608.

The machine-readable storage medium 628 may also be used to store instructions for a data iterator with automatic caching, as described herein. While the machine-readable storage medium 628 is shown in an exemplary embodiment to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
receiving a request, from a data iterator associated with a machine learning model, for a data output of a module in a data processing pipeline comprising a plurality of modules, wherein the module is a particular module of the plurality of modules and the request comprises a unique identifier associated with the particular module, wherein each module of the plurality of modules in the data processing pipeline has an associated cache, the data iterator to obtain machine learning training data for the machine learning model and to apply the machine learning training data to the plurality of modules in the data processing pipeline to format the machine learning training data into an expected form prior to providing the machine learning training data to the machine learning model, wherein an output of each intermediate module of the plurality of modules is provided as an input to a subsequent module of the plurality of modules and to a cache associated with the intermediate module that generated the output;
determining whether a data output of the module is stored in the associated cache, wherein the data output is tagged with the unique identifier to indicate that the data output is associated with the particular module, and wherein the unique identifier encodes a subset of the plurality of modules in the data processing pipeline up to and including the particular module; and
responsive to the data output being stored in the associated cache, providing the data output from the associated cache to the data iterator without processing data through the module.

2. The method of claim 1, responsive to the data output not being stored in the associated cache, determining whether a data input for the module is stored in a cache associated with a first preceding module in the data processing pipeline.

3. The method of claim 2, responsive to the data input for the module being stored in the cache associated with the first preceding module:
processing the data input through the module to generate the data output of the module; and
storing the data output of the module in the associated cache.

4. The method of claim 2, responsive to the data input for the module not being stored in the cache associated with the first preceding module, determining whether a data input for the first preceding module is stored in a cache associated with a second preceding module in the data processing pipeline.

5. The method of claim 4, responsive to the data input for the first preceding module being stored in the cache associated with the second preceding module:
processing the data input through the first preceding module to generate a data output of the first preceding module; and
storing the data output of the first preceding module in the cache associated with the first preceding module.

6. The method of claim 1, wherein the data processing pipeline to cache any non-updated machine learning training data for use by the machine learning model in conjunction with updated machine learning training data processed by the data processing pipeline.

7. A computing device comprising:
one or more processors; and
memory to store computer-executable instructions that, if executed, cause the one or more processors to:
process machine learning training data using one or more pipelined processing steps, the one or more pipelined processing steps to format the machine learning training data into an expected form before providing the machine learning training data to a machine learning model, wherein only updated machine learning training data is to be processed, wherein each of the one or more pipelined processing steps is associated with at least one module in a data processing pipeline, and wherein an output of each intermediate module of the plurality of modules is provided as an input to a subsequent module in the data processing pipeline and to a cache associated with the intermediate module that generated the output;

cache non-updated machine learning training data for use by the machine learning model in conjunction with the updated machine learning training data; and responsive to a request for a data output of a particular module in the data processing pipeline, the request comprising a unique identifier associated with the particular module, provide the data output, wherein the data output is tagged with the unique identifier to indicate that the data output is associated with the particular module, and wherein the unique identifier encodes a subset of the plurality of modules in the data processing pipeline up to and including the particular module.

8. The computing device of claim 7, wherein the updated machine learning training data has not been previously processed by the one or more pipelined processing steps.

9. The computing device of claim 8, wherein the non-updated machine learning training data has been previously processed by the one or more pipelined processing steps.

10. The computing device of claim 7, wherein the one or more processors to cache the non-updated machine learning training data in a cache associated with the at least one module in the data processing pipeline.

11. The computing device of claim 10, wherein the one or more processors further to:

receive the request, from a data iterator associated with the machine learning model, for machine learning training data having been processed by the one or more pipelined processing steps;

determine whether the machine learning training data is stored in an associated cache; and responsive to the machine learning training data being stored in the associated cache, provide the machine learning training data from the associated cache to the data iterator.

12. One or more machine-readable mediums having stored therein instructions which, if performed by one or more processors, cause the one or more processors to:

receive a data object to be processed by a data processing pipeline, the data object comprising at least a portion of a set of machine learning training data;

provide the data object to a first module of a plurality of modules in the data processing pipeline, the plurality of modules in the data processing pipeline to format the portion of the set of machine learning training data into an expected form prior to being provided to a data iterator associated with a machine learning model;

generate an output of each of the plurality of modules, wherein an output of each intermediate module of the plurality of modules is provided as an input to a subsequent module of the plurality of modules;

store the output of each of the plurality of modules in a cache associated with the intermediate module that generated the output; and provide the output of at least one of the plurality of modules from the cache to the data iterator associated with the machine learning model responsive to a request from the data iterator, wherein the at least one of the plurality of modules is a particular module and the request comprises a unique identifier associated with the particular module, and wherein the output is tagged with the unique identifier to indicate that the output is associated with the particular module, and wherein the unique identifier encodes a subset of the plurality of modules in the data processing pipeline up to and including the particular module.

13. The one or more machine-readable mediums of claim 12, wherein each module of the plurality of modules is configured to perform a corresponding processing operation.

14. The one or more machine-readable mediums of claim 12, wherein the instructions further cause the one or more processors to:

receive the request from the data iterator; and determine whether the output of the at least one of the plurality of modules is stored in the cache.

15. The one or more machine-readable mediums of claim 14, wherein responsive to the output not being stored in the cache, determining whether an input for the at least one of the plurality of modules is stored in the cache.

16. The one or more machine-readable mediums of claim 15, responsive to the input for the at least one of the plurality of modules being stored in the cache, the instructions further cause the one or more processors to:

process the input through the at least one of the plurality of modules to generate the output; and store the output of the at least one of the plurality of modules in the cache.

17. The method of claim 1, wherein a first module of the plurality of modules in the data processing pipeline is configured to:

receive the machine learning training data;

perform a first processing operation on the machine learning training data to generate a first output;

store the first output in a cache associated with the first module; and provide the first output to a second module of the plurality of modules in the data processing pipeline.

18. The computing device of claim 7, wherein a first module in the data processing pipeline is configured to:

receive the machine learning training data;

perform a first processing operation on the machine learning training data to generate a first output;

store the first output in a cache associated with the first module; and provide the first output to a second module of the plurality of modules in the data processing pipeline.

19. The one or more machine-readable mediums of claim 12, wherein a first module of the plurality of modules in the data processing pipeline is configured to:

receive the machine learning training data;

perform a first processing operation on the machine learning training data to generate a first output;

store the first output in a cache associated with the first module; and provide the first output to a second module of the plurality of modules in the data processing pipeline.

* * * * *